(12) United States Patent  
Rocklin et al.

(10) Patent No.: US 8,061,657 B2
(45) Date of Patent: Nov. 22, 2011

(54) METHOD AND APPARATUS FOR AIRCRAFT ANTI-ICING

(75) Inventors: Mark Rocklin, Cincinnati, OH (US); Georgia C. Karvountzi, Liberty Township, OH (US); Daniel S. Hummel, West Chester, OH (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 12/347,564

(22) Filed: Dec. 31, 2008

(65) Prior Publication Data

US 2010/0163677 A1    Jul. 1, 2010

(51) Int. Cl.
*B64D 15/02* (2006.01)

(52) U.S. Cl. .................................. 244/134 B; 138/116

(58) Field of Classification Search ............. 244/134 R, 244/134 B; 138/32, 116, 117
See application file for complete search history.

(56) References Cited

U.S. PATENT DOCUMENTS

| | | |
|---|---|---|
| 3,981,466 A | 9/1976 | Shah |
| 4,175,640 A | 11/1979 | Birch et al. |
| 4,688,745 A | 8/1987 | Rosenthal |
| 4,738,416 A | 4/1988 | Birbragher |
| 4,741,499 A | 5/1988 | Rudolph et al. |
| 5,011,098 A | 4/1991 | McLaren et al. |
| 5,088,277 A | 2/1992 | Schulze |
| 5,114,100 A | 5/1992 | Rudolph et al. |
| 5,257,498 A | 11/1993 | Nikkanen et al. |
| 5,400,984 A | 3/1995 | Arnold et al. |
| 5,807,454 A | 9/1998 | Kawabe et al. |
| 5,873,544 A | 2/1999 | Pike et al. |
| RE36,215 E | 6/1999 | Rosenthal |
| 6,003,814 A | 12/1999 | Pike et al. |
| 6,119,978 A | 9/2000 | Kobayashi et al. |
| 6,267,328 B1 | 7/2001 | Vest |
| 6,354,538 B1 | 3/2002 | Chilukuri |
| 6,443,395 B1 | 9/2002 | Porte et al. |
| 6,467,730 B2 | 10/2002 | Laugt |
| 6,702,233 B1 | 3/2004 | DuPont |
| 6,990,797 B2 | 1/2006 | Venkataramani et al. |
| 7,055,304 B2 | 6/2006 | Courtot et al. |
| 7,131,612 B2 | 11/2006 | Baptist et al. |
| 7,278,610 B2 | 10/2007 | Giamati |
| 7,849,885 B2 * | 12/2010 | Olsen et al. ................... 138/115 |
| 2006/0107910 A1 | 5/2006 | Bourgault |
| 2008/0029648 A1 | 2/2008 | Giamati |
| 2008/0308169 A1 * | 12/2008 | Nielsen et al. ................ 138/116 |
| 2009/0025814 A1 * | 1/2009 | Olsson .......................... 138/109 |
| 2009/0255602 A1 * | 10/2009 | McMasters et al. .......... 138/115 |

* cited by examiner

*Primary Examiner* — Tien Dinh
*Assistant Examiner* — Michael Kreiner
(74) *Attorney, Agent, or Firm* — David J. Clement, Esq.; Armstrong Teasdale LLP

(57) ABSTRACT

An aircraft anti-icing system includes a source of high temperature gas, a housing, at least one conduit to carry the high temperature gas from the source to the housing, the at least one conduit coupled to the housing and the source, at least one nozzle coupled to the at least one conduit, at least one nozzle configured to impart a rotational motion to the high temperature gas before exhausting the high temperature gas into the housing, and a port for exhausting air from the housing.

12 Claims, 4 Drawing Sheets

METHOD AND APPARATUS FOR AIRCRAFT ANTI-ICING

BACKGROUND OF THE INVENTION

The present invention relates to an improvement in anti-icing systems for aircraft jet engine propulsion systems.

The formation of ice on aircraft wings, propellers, air inlets of engines, etc. has been a problem since the earliest days of heavier-than-air flight. Any accumulated ice adds considerable weight, and changes the airfoil or inlet configuration making the aircraft much more difficult to fly and in some cases has caused loss of aircraft. In the case of jet aircraft, large pieces of ice breaking loose from the leading edge of an engine inlet housing can damage rotating turbine blades or other internal engine components and cause engine failure.

One of the most common anti-ice techniques has been the ducting of hot gases into a housing adjacent to the likely icing area. Current techniques to solve this problem generally fall into one of two types of systems: Impingement style ring systems or swirl nozzle systems. In each case, the hot gas conduits simply dump hot gases into a housing, such as the leading edge of a jet engine housing or a wing leading edge. While often useful, these systems are not fully effective due to the low quantity of hot gases introduced relative to the mass of air in the housing, the heating effect tending to be limited to the region near the hot gas introduction point, and the complexity of the hot gas duct system.

In impingement style ring systems, hot air is impinged on the metal lipskin by strategically positioned holes in an annulus shaped tube that runs 360 degrees around the front of the inlet. The air impinges on the internal lipskin surface and causes the metal temperature to increase and break off any ice accretion.

The existing swirl nozzles discharge the hot air through a few non-circular sub-nozzles that create a flow field. The air is discharged at a high velocity so that it creates a swirling effect in the forward most inlet compartment, commonly referred to as the D-duct. The air continues to move 360 degrees around the annular D-duct compartment. It circulates around the compartment several times until it exits into the ambient through an exhaust port. Since the inlet lipskin consists of most of the internal compartment surface area, the hot air heats the lipskin and causes any ice accretion to break loose. Although the figures and verbiage of the specification use nose cowl deicing for explanatory purposes, the invention disclosed herein may apply to any other housing subject to ice formation including, but not limited to, wing conduits and ducts.

Both systems have limitations. The impingement ring style anti-ice systems have a cumbersome tube and support structure that runs 360 degrees around the front inlet compartment. While these systems generally have very high heat transfer ratios they are also very heavy. Swirl nozzle systems are generally significantly lighter than impingement ring style systems and use less air to de-ice but suffer from lower heat transfer.

BRIEF DESCRIPTION OF THE INVENTION

In one embodiment, an aircraft anti-icing system is provided. The system includes a source of high temperature gas, a housing, at least one conduit to carry the hot gas from the source to the housing, the at least one conduit coupled to the housing and the source, at least one nozzle coupled to the at least one conduit, the at least one nozzle configured to impart a rotational motion to the hot gas before exhausting the gas into the housing, and a port for exhausting air from the housing.

In a second embodiment, a method of anti-icing a jet airplane housing is provided. The method includes directing heated gasses from the engine to a housing, imparting both a rotational and translational movement to the heated gasses, channeling the heated gasses into the housing, and exhausting the gasses from the housing.

In a third embodiment a jet aircraft anti-icing system is provided. The system includes a source of high temperature gas, a housing, at least one conduit to carry the hot gas from the source to the housing, the at least one conduit coupled to the housing and the source of high temperature gas, at least one nozzle coupled to the at least one conduit, the at least one nozzle configured to impart a rotational motion to the hot gas before exhausting the gas into the housing, and a port for exhausting air from the housing.

BRIEF DESCRIPTION OF THE DRAWINGS

FIG. 1 is a schematic representation of a typical jet turbine engine;

FIG. 2 is a schematic view of a jet engine inlet;

FIG. 3 is a partial view of a nose lip including the swirl nozzle;

FIG. 4 is a schematic representation of the swirl nozzle assembly;

FIGS. 5-7 show embodiments with different swirl nozzle locations and or orientations respective to the nose cowl; and FIG. 8 is a partial view of a wing housing including the swirl nozzle.

DETAILED DESCRIPTION OF THE INVENTION

Figure 1:
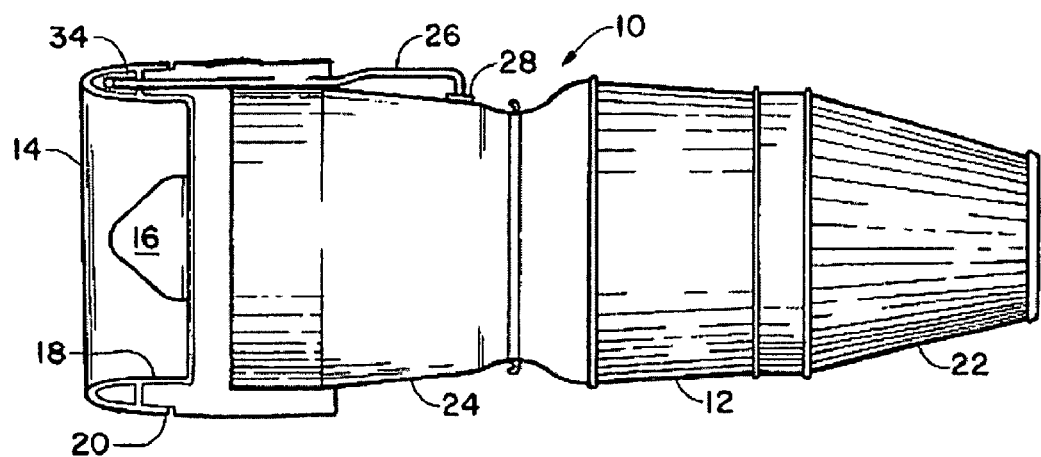
FIGS. 1-8 show exemplary embodiments of the method and apparatus described herein.

Referring now to the drawings in detail and in particular to FIG. 1, there is seen a schematic representation of a jet turbine engine 10 of the type suitable for aircraft propulsion. The turbine engine 10 is housed within a central housing 12. Air enters the engine 10 through an air inlet section 20, between the spinner 16 of the engine and the nose lip or annular single skin housing 14 which constitutes the forward most section of the air inlet 20 of the engine nacelle, some of which components have been omitted from the figure for simplicity. Engine thrust is produced by burning incoming air and fuel within the central housing 12 and passing the hot, high pressure propulsion gases through exhaust outlet 22 and out the rear of the engine.

In flight, ice tends to form on the nose lip 14 (in addition to other aircraft components omitted for simplicity). The ice changes the geometry of the inlet area 18 between the nose lip 14 and the spinner 16, adversely affecting the required quantity, flow path and quality of incoming air. Also, pieces of ice may periodically break free from these components and enter the engine, damaging rotor blades and other internal engine components.

Within the compressor section 24 of the jet engine 10 there is a region containing hot gases. A suitable conduit means 26 or tube is connected at a first end 28 to that hot region. In one embodiment the hot region is the environmental bleed air manifold although in other embodiments the hot region may be any other hot air source such as the compressor discharge bleed air manifold. The other end 30 penetrates a bulkhead 32 that substantially closes the nose lip 14 to form the D-duct to enclose a quantity of air with the annular space created by such bulkhead 32 and the nose lip 14.

Figure 5:
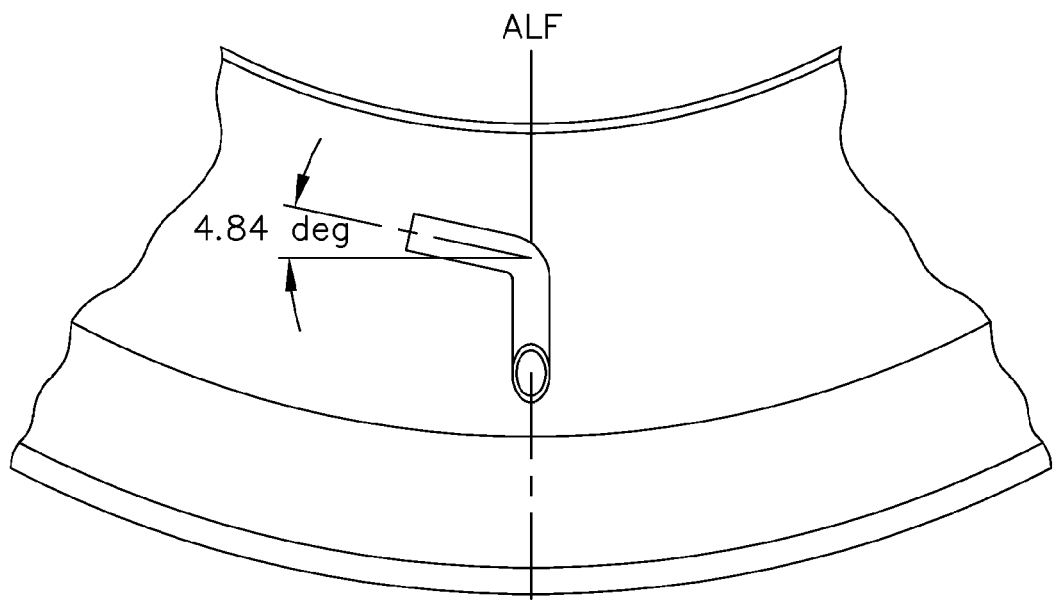
Figure 6:
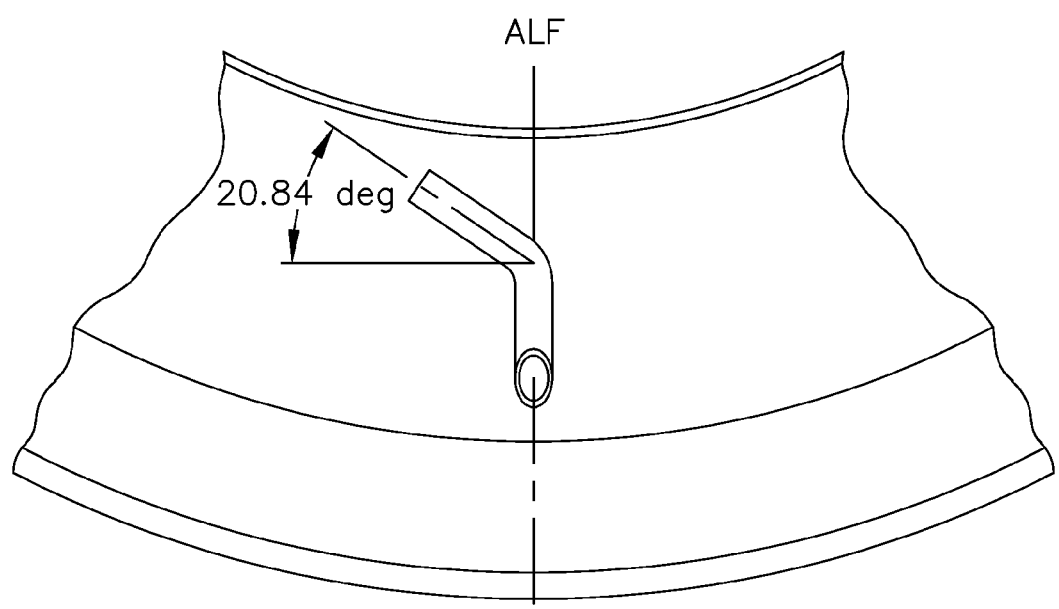
Figure 7:
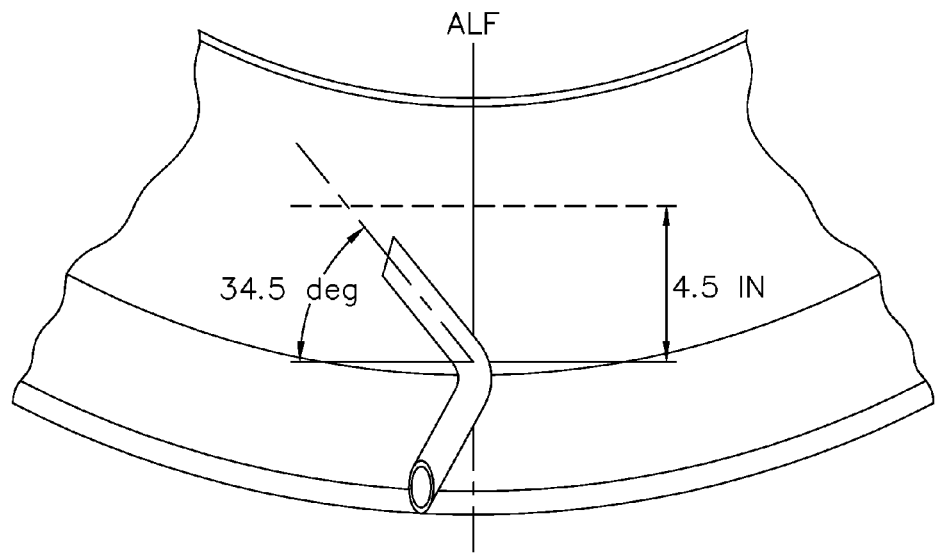
Figure 8:
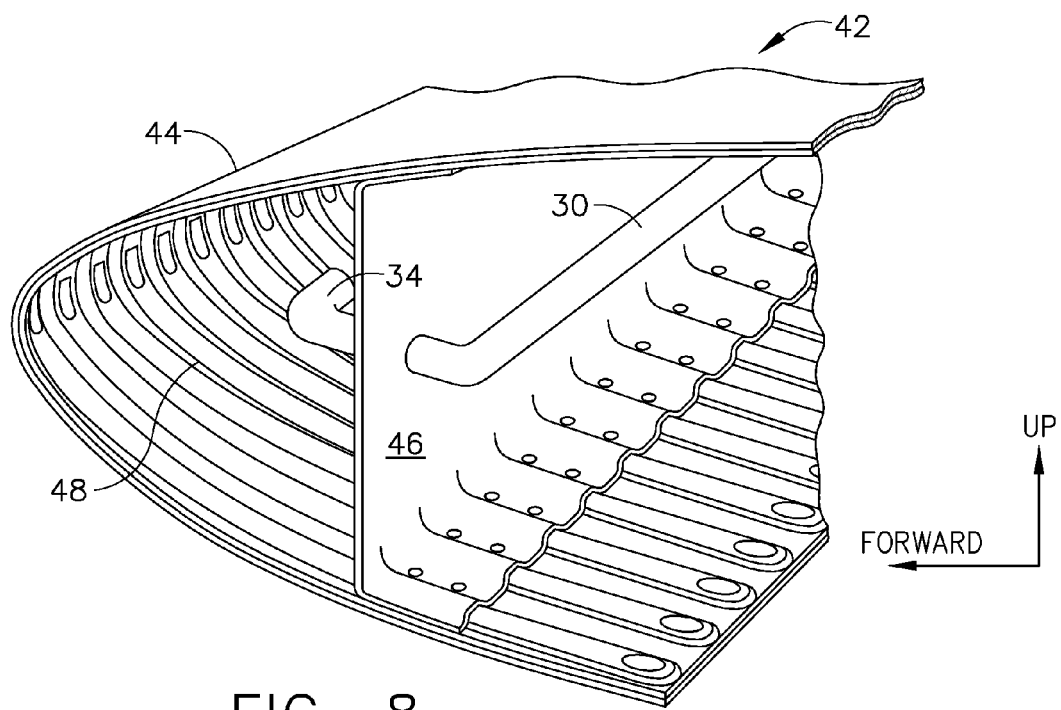

The conduit 30 carrying the hot, high pressure gas from the compressor section of a jet engine 10 extends through the bulkhead 32 that closes off the annular nose lip 14 of the inlet 18 to create an annular chamber filled with air. The conduit 30 has an outlet nozzle 34 connected to its outlet end. The outlet nozzle 34 is preferably bent substantially 90 degrees so that the very end of the outlet nozzle 34 is approximately tangent to the centerline of the annular nose lip 14. In other embodiments the angle may be substantially greater or less. In even more embodiments, as shown in FIGS. 5-7, the outlet nozzle 34 may be rotated with respect to any other axis and translated either up or down and fore or aft in the nose lip 14.

Figure 2:
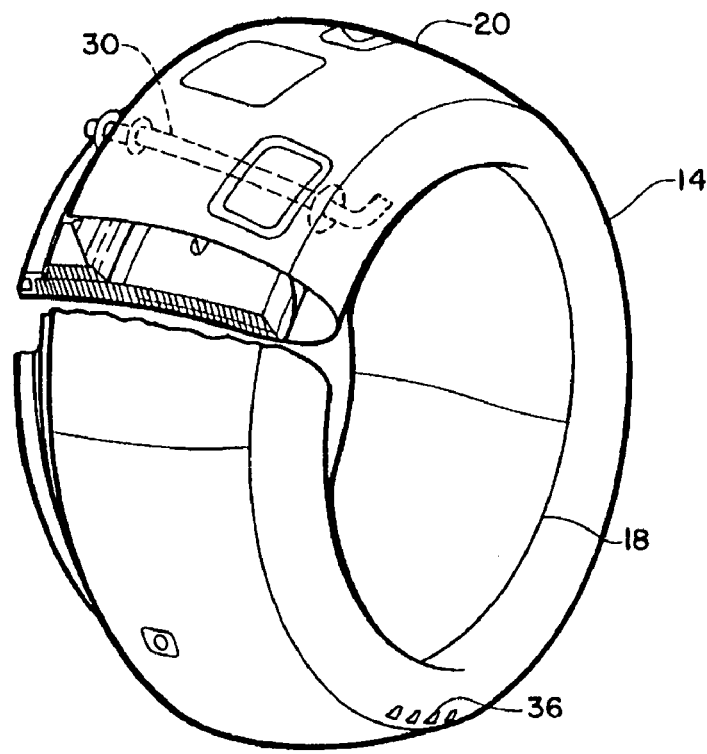
Figure 3:
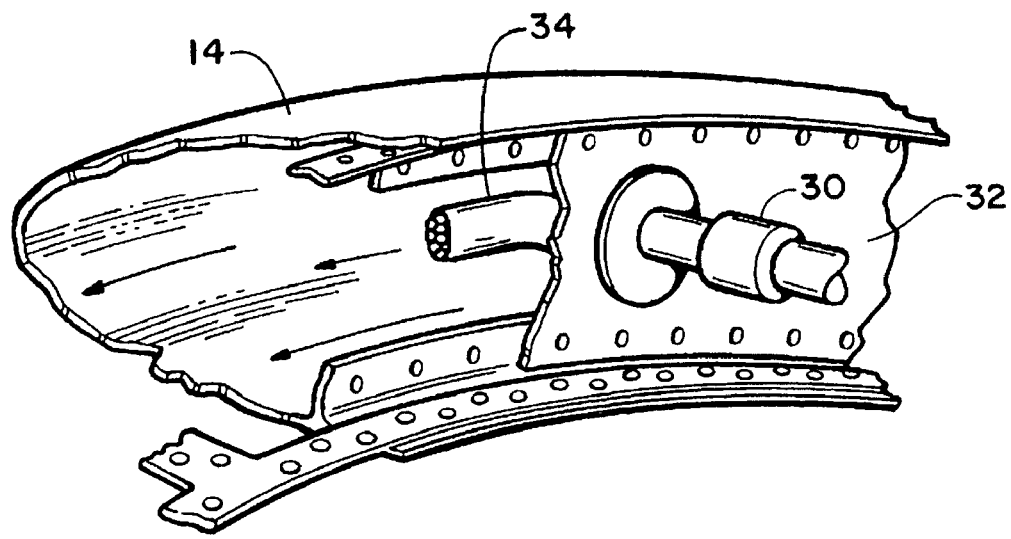
Figure 4:
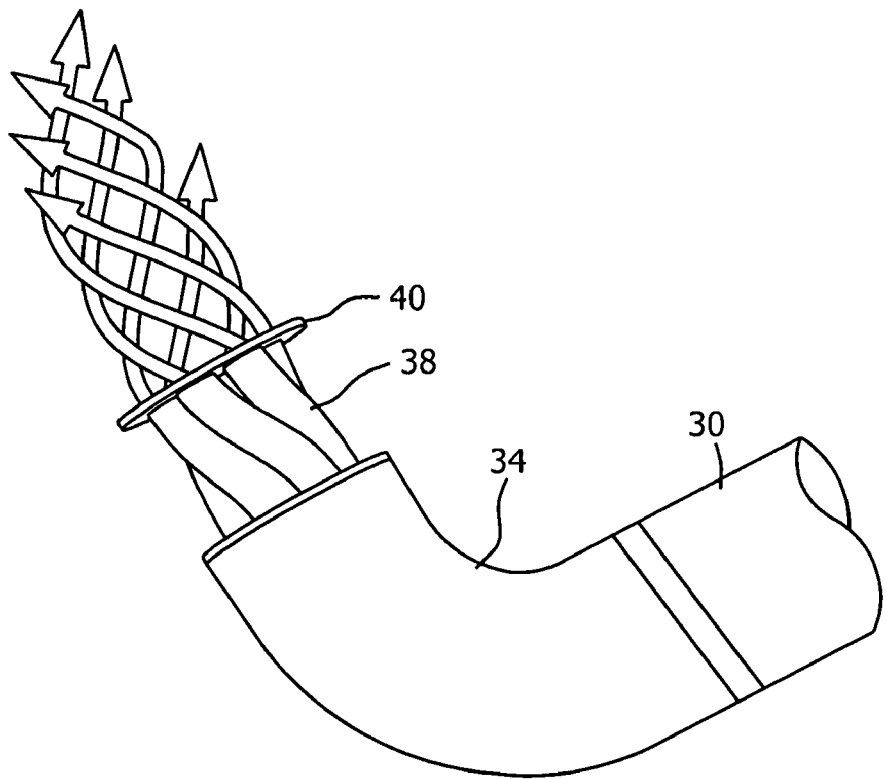

The nozzle 34 is configured to impart a rotational flow as the hot gas moves inside the nozzle 34. In one embodiment the nozzle 34 contains a plurality of fluid flow passages 38 twisted in a helical pattern. In the preferred embodiment four to six fluid flow passages 38 are used, however in other embodiments the number of passages could be substantially more or less. Additionally other means may be used to cause the rotation including but not limited to internal vanes or nozzles. As the hot gas moves inside the nozzle 34 the fluid flow passages 38 impart a rotational movement to the gas and then eject it out the nozzle outlet 40 into the nose lip 14. It will be recognized that the injection of the hot gas stream into the housing air will cause the entrained mass of air to rotate within the nose lip 14 in a swirling rotational direction. Also, as seen in FIG. 2, as the mass of entrained air rotates within the nose lip 14 a suitable exhaust means, shown as suitably sized holes 36 formed in an outboard position of the nose lip 14, permit a portion of such entrained air to escape the nose lip 14 equal to the mass flow rate of hot gas being injected into the nose lip 14 to maintain an equilibrium of flow. In other embodiments holes 36 may be located in other areas including but not limited to the rear of housing 14.

It will be recognized that as the hot gas is emitted from the nozzle 34 the hot gases rapidly mix with the ambient air in the nose lip 14, to rapidly reach a temperature intermediate between the entering hot gas temperature and that of the stagnant air. The temperature of the air within the nose lip 14 will continue to rise until an equilibrium condition is reached. As the temperature in the nose lip 14 rises higher amounts of energy will be lost through the skin in the form of conduction and will be lost in the air leaving the nose lip 14. When the amount of energy leaving the nose lips 14 equals the amount entering then the temperature will hold steady at a maximum temperature. With the nozzle 34 and the enhanced mixing of the hot, high pressure gas and the air contained within the housing 14, any tendency of the rotating heated air mass to generate a localized area of elevated temperature in the skin of the nose lip 14 will be materially reduced.

In another embodiment the conduit 30 carries hot, high pressure gas from the jet engine 10 to a wing 42. The conduit 30 runs away from the aircraft substantially parallel to the leading edge 44 of the wing 42. Near the end of wing 42 the conduit 30 bends approximately 90 degrees and passes though a bulkhead 46 into a wing duct 48. Outlet nozzle 34 is coupled to the conduit 30 and oriented to eject the swirling, hot, high pressure gas into wing duct 48 substantially parallel to leading edge 44 in the direction of the main body of the airplane. Exhaust vents (not shown) are provided to exhaust heated air from the wing duct 48.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft anti-icing system comprising:
   a source of high temperature gas;
   a housing;
   at least one conduit configured to carry the high temperature gas from the source to the housing;
   at least one nozzle coupled to said at least one conduit, said at least one nozzle configured to impart a rotational motion to the high temperature gas before exhausting the high temperature gas into the housing; and
   a port for exhausting air from the housing;
   wherein said at least one nozzle comprises a longitudinal axis and a plurality of tubes wrapped around the longitudinal axis of the at least one nozzle to form a helix; and
   wherein the housing comprises one of a nose cowl and a wing.

2. A system in accordance with claim 1 wherein the source of high temperature gas is one of an environmental bleed air manifold and a compressor discharge bleed air manifold.

3. A system in accordance with claim 1 wherein the at least one nozzle comprises a plurality of internal vanes.

4. A system in accordance with claim 1 wherein the high temperature gas mixes with air from the housing after the high temperature gas exits the at least one nozzle.

5. A system in accordance with claim 1 wherein the at least one nozzle is configured to increase a speed of the high temperature gas exiting the at least one nozzle.

6. A jet aircraft anti-icing system in accordance with claim 1 wherein the at least one nozzle is bent about a central axis of the at least one conduit.

7. A method of anti-icing a jet airplane housing, said method comprising:
   providing the system of claim 1;
   directing heated gasses from an engine to the housing;
   imparting both a rotational and translational movement to the heated gasses;
   channeling the heated gasses into the housing; and
   exhausting the heated gasses from the housing.

8. A method in accordance with claim 7 wherein directing heated gasses from the engine to the housing comprises thermally connecting the at least one conduit to a hot high pressure region of the engine.

9. A method in accordance with claim 7 wherein exhausting the heated gasses into the housing comprises accelerating the heated gasses through an outlet of the at least one nozzle.

10. A method in accordance with claim 7 wherein imparting both a rotational and a translational movement to the heated gasses comprises directing the heated gasses through the plurality of tubes, the plurality of tubes being wrapped about each other in a helical configuration.

11. A method in accordance with claim 7 wherein exhausting the heated gasses from the housing comprises locating the exhaust port in a wall of the housing.

12. A method in accordance with claim 11 wherein directing heated gasses from an engine to the housing comprises directing heated gasses from an engine to at least one of an engine nose cowl and a wing.

\* \* \* \* \*